June 10, 1969     SVEN-ÅKE NORDEGREN     3,448,756

AUTOMATIC PULSATOR

Original Filed March 3, 1965

INVENTOR.
Sven-Åke Nordegren
BY
Davis, Hoxie, Faithfull & Hapgood
ATTORNEYS

United States Patent Office 3,448,756
Patented June 10, 1969

3,448,756
AUTOMATIC PULSATOR

Sven-Åke Nordegren, Sodertalje, Sweden, assignor to Alfa-Laval AB, Tumba, Sweden, a corporation of Sweden
Continuation of application Ser. No. 436,793, Mar. 3, 1965. This application Aug. 22, 1967, Ser. No. 662,479
Claims priority, application Sweden, Mar. 11, 1964, 3,031/64
Int. Cl. G05d 7/00, 9/00; F17d 3/00
U.S. Cl. 137—104      5 Claims

ABSTRACT OF THE DISCLOSURE

Two chambers are formed by a casing having a duct to be connected alternately to a vacuum source and a pressure source, and each chamber contains a piston reciprocable between two end positions and dividing its chamber into two subchambers, one of which communicates through a channel with a subchamber of the other chamber and is otherwise sealed. The two pistons are positively coupled to each other through a connection to form a piston means which operate a control member to put parts of the piston means in communication alternately with the vacuum source and the pressure source, thereby reciprocating the piston means and causing fluid to flow back and forth between the intercommunicating sealed subchambers. A valve member, operated by the piston means, connects the duct alternately to the vacuum source and the pressure source.

---

Figure 1:
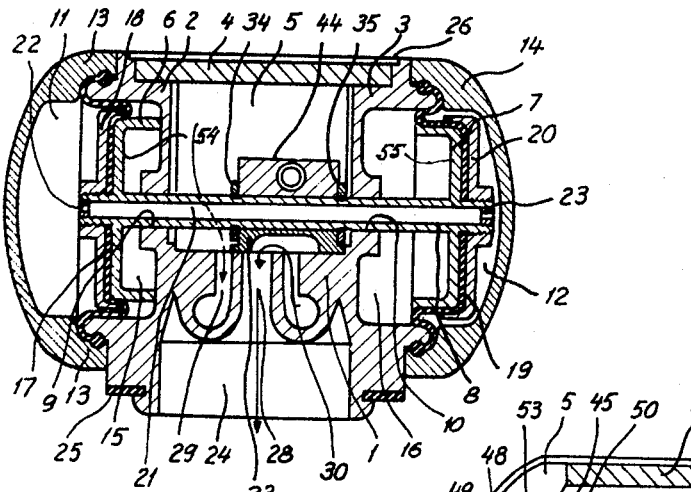

The present invention relates to an automatic pulsator of the piston type.

The present application is a continuation of my copending application Ser. No. 436,793, filed Mar. 3, 1965, now abandoned.

The term pulsator designates a device which alternately brings one or more ducts in communication with a vacuum source and a pressure source, in the latter case usually the atmospheric pressure. The alternate communications are brought about automatically. The periods during which the vacuum and the pressure prevail may be of the same duration or of different durations. In milking machines, for example, where each milking machine unit consists of four teat cups, the operation is based either upon the principle that all four teat cups are simultaneously subjected to pressure and then to vacuum in order to bring about a massage of the teats, whereby the pulsator only needs to operate on one duct to which all the teat cups are connected, or upon the principle that two of the teat cups are simultaneously subjected to pressure while the two other ones are subjected to vacuum and vice versa, in which case the pulsator must operate on two ducts, whereby two teat cups are connected to one of the ducts and the two other teat cups to the other one.

The hitherto known automatic pulsators do not, however, operate satisfactorily. The main trouble with the hitherto known pulsators is that they do not operate with a constant pulsation rate, i.e., that the duration of the suction and pressure periods is not constant but varies in operation. The pulsations massage the udder and said massage should be as constant as possible independently of which pulsator is used to operate the milking unit and without variations from one time to another when using the same pulsator. The cow is, in fact, a creature of habit and may be accustomed to a certain massage of the udder, even if said massage is and remains irregular in a permanent way. The cow then feels content, eats normally, is a quiet and easy milker and gives willingly a maximum of her milk. If the massage of the udder differs from one time to another, the neurohormonal functions of the cow are disturbed, the cow becomes restless, does not eat properly and gives less milk, which implies trouble and economic losses for the farmer. It is therefore most important to offer the farmers a pulsator which operates with pulsations of constant duration.

The hitherto known pulsators operate with air or a liquid as damping medium for the elements in the pulsator which, owing to the damping, are to bring about a certain temporization and a constant velocity of motion. This is obtained in such way that the air or the liquid, while it is to act as a damper, passes through one of several throttlings. Said throttlings are very small and if the medium is not perfectly clean, which it seldom is even when filtered, the throttling gets clogged and the flow velocity changes immediately, which results in a detrimental variation of the pulsator rate.

Prior art pulsators are of two kinds, i.e., piston type pulsators and diaphragm type pulsators. The piston type pulsators have the drawback that the pistons must be lubricated with a lubricant and since the latter has a different viscosity at different temperatures, the pulsator rate may not be kept constant owing to the variable piston friction. The diaphragm pulsator requires, on the other hand, no lubricant but has the drawback of requiring a very complicated and expensive construction if it is to allow a pulsation of 1:2.5 ratio or a ratio differing from the 1:1 ratio.

The new pulsator is mainly intended to be used in connection with machine milking and pipeline milking but may also be used for other purposes where a pulsator with a constant pulsation rate is required.

The pulsator according to the invention has the advantage that it always operates at a constant speed and consequently with a constant pulsation rate, and the possibilities that these properties may vary in operation are practically nonexistent.

This advantage derives from the construction of the pulsator, whereby several more or less known construction characteristics cooperate to reach the desired result, which appears from the following.

Owing to the fact that the piston member consists of two pistons which are firmly connected to each other by means of a piston rod and that the pistons have a comparatively large and rigid surface in relation to their chambers and that the pressure source and the vacuum source alternately act upon said surfaces without restrictions, the piston member is rapidly set in motion and actuated by these sources during its whole stroke.

Owing to the fact that the piston member is provided with an external, entirely closed chamber outside of each piston, which chambers are put in communication with each other through a duct in the piston rod, a medium enclosed in one of these chambers will, during the operation of the piston member, flow under a constant resistance from one of the chambers to the other one and thus damp the motion of the piston member so that the latter will move from one end position to the other one at a constant velocity. The entirely sealed system ensures that external impurities cannot pollute the medium and affect the resistance to flow by setting in the flow path of the medium.

Owing to the fact that the periphery of the piston does not come into contact with the walls in the chambers in which the pistons move, the guiding of the pistons being entirely achieved by guiding of the piston rod only, the frictional resistance during the motion of the piston member has been reduced to minimum so that the risks that a change in that frictional resistance would detrimentally affect the constant motion velocity of the piston member are practically eliminated and if, in spite of that, a change in the frictional resistance should occur, said variation is entirely overcome by the magnitude of the driving forces which act upon the pistons.

Owing to the fact that the piston member is guided by the bearings of the piston rod only, a leakage along the piston rod constitutes the only possibility of loss of driving medium and said loss is so small that it is negligible, considering that the ports for the admission of driving medium are entirely open during the whole stroke of the piston.

The duct in the piston rod for the flow of damping medium from one outer chamber to the other one has made it possible to achieve a simplified and advantageous design which allows for an easy cleansing of said duct.

Owing to the fact that the control device, which alternately opens and shuts the ports which put the inner chambers in communication with the pressure source, and the vacuum source, is positively controlled by the piston member and rapidly ensures the switching over of the piston member in the end positions, it is ensured that the pistons are subjected to the full driving power during practically the whole stroke of the piston member.

Figure 2:
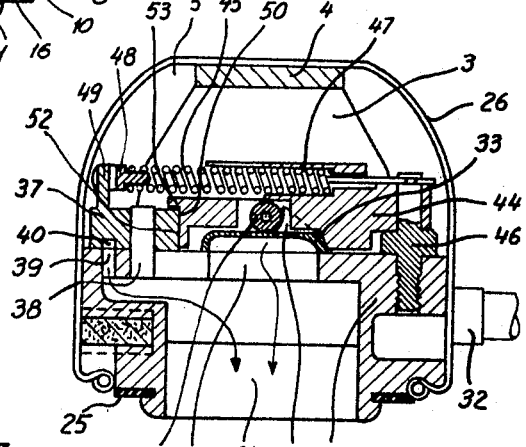
Figure 3:
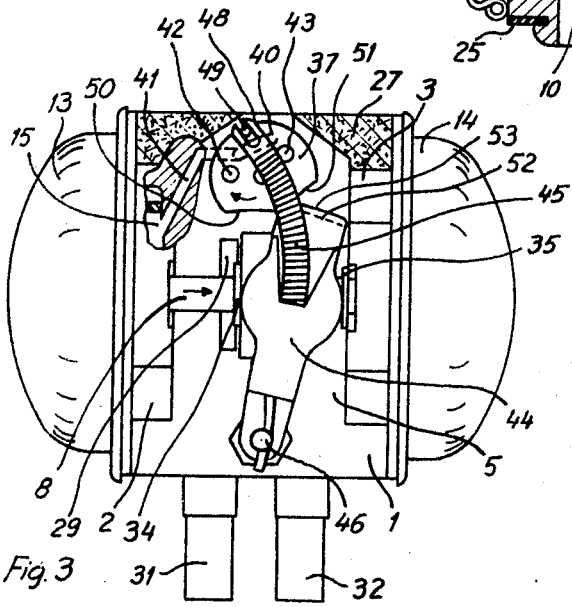
Figure 4:
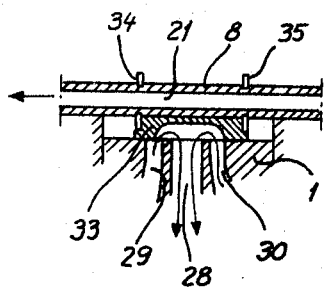

The invention is shown in one of its embodiments on the attached drawing on which FIG. 1 shows a longitudinal section of an automatic pulsator, FIG. 2 a cross-section of the same pulsator and FIG. 3 a view from above in FIG. 1 with certain parts removed and a part shown in section, while FIG. 4 shows a detail of FIG. 1 in another position.

The pulsator according to the drawing consists of a supporting body 1 which, with two side walls 2, 3 and a head piece 4 firmly fixed to said walls, surrounds a cavity 5 for the pulsator mechanism, which cavity communicates with the atmosphere. A piston member consisting of two pistons 6 and 7 as well as a piston rod 8 in one piece with the piston is arranged so that the piston rod is mounted in the side walls 2 and 3 and displaceable in longitudinal direction in the bearings 9 and 10. The bearings are provided with sealing devices not shown on the drawing. The pistons 6 and 7 are located outside the side walls 2 and 3 in chambers formed by recesses 11 and 12 in the end pieces 13 and 14 and recesses 15 and 16 in the side walls 2 and 3. A folded diaphragm 17 of resilient or flexible material is clamped liquid-tight by means of a washer 18 to the piston 6 and another folded diaphragm 19 is clamped in the same way by means of a washer 20 to the piston 7. The free outer edges of the folded diaphragms are clamped liquid-tight between the end piece 13 and the side wall 2 and between the end piece 14 and the side wall 3, respectively. All edges with which the folded diaphragm may come into contact are rounded in order not to wear the folded diaphragm. An ample clearance is arranged between the peripheral surfaces of the pistons 6, 7 and the chamber walls surrounding them. The folded diaphragms divide the piston chambers into four chambers separated from each other which are designated by the same reference numerals as for the respective recesses and therefore the recesses 11, 12, 15 and 16 will be referred to as chambers in the following. The end pieces 13 and 14 are fastened to the supporting body 1 by means of screws not shown on the drawing. The piston rod 8 is provided with a duct 21 which directly connects the chamber 11 to the chamber 12. At both ends the duct 21 is provided with throttlings 22, 23 shown as rings screwed into the duct.

The supporting body 1 is connected to a vacuum source through its channel 24 and the connection is sealed by a packing 25. The transparent, resilient cover 26 surrounds the major part of the supporting body 1. The cavity 5 communicates with the atmosphere through a filter 27 whereby the atmospheric air is cleaned by the filter before entering the cavity 5.

The channel 24 communicates with the cavity 5 through a channel 28 and, on both sides of the channel 28, the supporting body 1 is provided with two other channels 29 and 30 of which the channel 29 is provided with an external connection 31 and the channel 30 with another connection 32. It is the two latter channels and connections which, under operation, are alternately subjected to pressure and vacuum or subatmospheric pressure.

The connection between the channels 29 and 30 as well as the cavity 5 which is permanently in communication with the atmosphere and its pressure, as well as the channels 28 and 24 which are in permanent communication with a vacuum source, is controlled by a valve member 33, in the present case in the form of a slide, which is movable in reciprocating action over the channel orifices 28, 29 and 30. The slide is fastened to the piston rod 8 by means of washers 34 and 35 and supported against said piston rod by a shoulder 36 on the slide. The slide therefore follows the movements of the piston rod.

The chamber 11 and 12 as well as the duct 21 in the piston rod form a chamber which is entirely filled with a liquid, the damping liquid, which is preferably constituted by a mixture of glycol and water.

Referring to the piston member with its two pistons 6 and 7, the inner end surfaces of these pistons are opposed to each other and are exposed to the pressures in chambers 15 and 16, respectively. The latter chambers are connected one to the vacuum source and the other to the pressure source, and provision is made for reversal of their connections to these two sources. This is brought about by means of a control member 37 in the form of a reversing slide. Said control member is rotatably mounted between two end positions on a pin 38 which is firmly secured to the supporting body 1.

The channel 24 from the vacuum source communicates via a channel 39 in the supporting body with the cavity 5 (see FIGS. 2 and 3), but the communication is shut off by the reversing slide 37 which on its underside is provided with a groove-shaped recess 40, the shape of which is indicated with dotted lines on FIG. 3. The supporting body 1 (see FIG. 3) is provided with a channel 41 which connects the chamber 15 with the groove 40 when the reversing slide 37 comes into its left hand end position shown in FIG. 3. The supporting body is likewise provided with another channel which corresponds exactly to the channel 41 but which connects the chamber 16 with the groove 40 and the channel 39 when the reversing slide 37 comes into its opposite end position after having been rotated around the pin 38. The chambers 15 and 16 may thus be alternately subjected to vacuum or subatmospheric pressure by the oscillation of the reversing slide 37.

The reversing slide or control member 37 is also provided with two vertical, through-going channels 42 and 43. Said channels are placed in such way that when the reversing slide 37 comes into the position shown in FIG. 3 and the chamber 15 communicates with the vacuum channel 24, the upper end of the channel 43 at the same time communicates with the cavity 5 and the atmosphere and the lower end of said channel communicates with chamber 16 via the channel in the supporting body which corresponds to the channel 41 so that the chamber 16 is subjected to the atmospheric pressure. In just that position of the reversing slide the chambers 15 and 16 thus cooperate with the pressure prevailing in them to displace the piston members 6, 7, 8 to the right hand side in FIG. 3. When the reversing slide comes into the other position the conditions are similarly reversed and the piston member is displaced to the left. The channel 42 then admits the atmospheric pressure to the channel 41 and consequently to the chamber 15 while the chamber 16 is connected to the vacuum source.

The motion of the reversing slide 37 is controlled by a reversing lever 44 and a reversing spring 45. The reversing lever 44 is rotatable around an axle 46 which is firmly secured to the supporting body 1 and provided with a bore 47 for the reversing spring 45. One of the ends of the reversing spring is rotatably fixed to the axle 46 and its other end surrounds the shaft of a fork 48 the shanks of which are grasping a projection 49 of the reversing slide 37.

The reversing slide 37 is provided with two curved surfaces 50 and 51 which slide in turn against a corresponding curved surface 52 on the reversing lever 44 and said curved surfaces cooperate to control the moment at which the reversing slide is to be switched over from one of its end positions to the other one. A projection 53 on the reversing lever 44 prevents the reversing slide from being lifted off the pin 38.

The piston 6 is provided with an end surface 54 which faces the chamber 15 and the piston 7 is provided with an end surface 55 which faces chamber 16, which end surfaces are opposite to each other.

The operation of the pulsator from the initial position shown is as follows.

The chamber 15 is subjected to vacuum through communication via the channel 41 with channel 24. At the same time the chamber 16 is subjected to atmospheric pressure with which it communicates via the channel 43 and a channel corresponding to channel 41 and leading to the chamber 16. The piston member 6, 7, 8 has at that instant just completed a displacement to the right hand side in FIGS. 1 and 2 owing to the pressure in the chambers 15, 16 whereby the liquid in the chamber 12 has streamed over to the chamber 11 by passing through the duct 21 in the piston rod in which it has been throttled so that the velocity of motion of the piston member has been damped and a constant velocity of the piston member has been obtained. During the motion of the piston member to the right, the valve member 33 has been taken along as well as the reversing lever 44 whereby the latter has performed a rotation around the axle 46 and bent as well as tightened the reversing spring 45. During this rotation the reversing lever has slid with its surface 52 against the surface 50 on the reversing slide 37 which thus has been locked against rotation around the pin 38. When the reversing lever 44 has reached its right hand end position in FIG. 3 the contact between the surfaces 50 and 52 is discontinued so that the reversing slide 37 is released and performs a rotation to the right hand side in the figure around the pin 38 under the action of the reversing spring. In this new position of the reversing slide the channel 42 is connected to the channel 41 and admits atmospheric pressure to the chamber 15 at the same time as the groove 40 on the underside of the reversing slide is connected to a channel which corresponds to the channel 41 and leads to the chamber 16, so that said chamber is connected to the vacuum source via the channels 39 and 24 and subjected to vacuum or depression. The pressure in the chambers 15 and 16 now are such that the piston member 6, 7, 8 moves to the left and with a damping action presses liquid from the chamber 11 over to the chamber 12, the liquid passing through the duct 21 in the piston rod. During this motion of the piston member the reversing lever 44 and the valve member 33 are again taken along but this time to the left, whereby the surface 52 of the reversing lever slides against the surface 51 of the reversing slide and the whole process is repeated but this time in left hand position. The described sequence discloses how the pulsator controls itself in operation and brings about an even piston stroke with a constant velocity between the end position and a constant number of reciprocating strokes per unit of time.

This constant rate of the pulsator is used to obtain the same constant motion of the valve member 33, which motion determines the duration of and the constant ratio between the suction and pressure phases of, for example, the teat cups of a milking machine connected to the pulsator.

The teat cups are connected to the connections 31 and 32 which are alternately subjected respectively to vacuum and pressure. In the position shown in FIGS. 1 and 3 the connection 32 communicates with the vacuum source via the channel 30, the valve member 33, the channel 28 and the channel 24. At the same time the connection 31 communicates with the atmospheric pressure via the channel 29 and the cavity 5. When the valve member 33 thereafter (see FIG. 4) moves to the left under the action of the piston member 6, 7 and 8, both channels 29 and 30 are for a short time put into communication with the vacuum source via the channel 28 while the connection with the atmosphere is entirely shut off. This situation ceases, however, very quickly as the valve member proceeds with its motion to the left and only the channel 29 remains in communication with the vacuum source while the channel 30 is uncovered at its top so that it communicates with the atmosphere. The process is repeated during the reciprocating, controlled motion of the valve member over the channels 29 and 30.

I claim:

1. An automatic pulsator comprising a casing having partition means forming two chambers and having a duct to be connected alternately to a vacuum source and a pressure source, piston means including a piston in each of said chambers and reciprocable therein between two end positions, each said piston dividing its chamber into an inner subchamber at the end of the piston nearest the other piston and an outer subchamber at the end of the piston farthest from said other piston, said piston means also including a connection positively coupling the pistons to each other and forming a channel interconnecting the outer subchambers, each said outer subchamber communicating permanently with the other outer subchamber through said channel and being otherwise sealed, means including a control member operable by the piston means to put parts of said piston means in communication alternately with said vacuum source and said pressure source, to reciprocate the piston means, thereby causing fluid flow back and forth between said intercommunicating sealed subchambers by way of said channel in said coupling connection, and a valve member operable by the piston means for connecting said duct alternately to the vacuum source and the pressure source.

2. A pulsator according to claim 1, in which each piston includes a rigid element having a periphery spaced from the surrounding wall of the chamber containing the piston, each piston also including a flexible element sealingly arranged between said periphery and surrounding wall.

3. A pulsator according to claim 2, in which the casing includes a main body and a removable cover defining each of said chambers, each said flexible element being secured between said main body and the corresponding cover.

4. A pulsator according to claim 1, comprising also a throttle in said channel through which the sealed subchambers communicate with each other.

5. A pulsator according to claim 1, in which said partition means also form a third chamber positioned between said inner subchambers and through which said coupling connection extends, said valve member being connected to said coupling connection and movable therewith in said third chamber, said means operable by the piston means including a reversing lever connected to said coupling connection and movable therewith in the third chamber, said means operable by the piston means also including a reversing spring operatively connecting the reversing lever to said control member to reverse the position of the control member, said lever and control member having respective coacting cam surfaces operable to hold the control member against reversal until near the end of a stroke of said piston means.

References Cited

UNITED STATES PATENTS

| | | | |
|---|---|---|---|
| 1,538,733 | 5/1925 | Oden | 137—104 XR |
| 2,051,371 | 8/1936 | Erling | 137—104 |
| 2,251,241 | 7/1941 | Kellogg | 91—344 XR |
| 2,501,294 | 3/1950 | Sigvard | 137—103 |
| 2,625,948 | 1/1953 | Marlow | 137—104 |
| 2,965,351 | 12/1960 | Campbell | 251—54 |
| 3,064,628 | 11/1962 | Canalizo | 91—347 XR |

FOREIGN PATENTS 71,250  11/1952  Netherlands.

WILLIAM F. O'DEA, *Primary Examiner.*

R. G. NILSON, *Assistant Examiner.*

U.S. Cl. X.R.

91—345, 347; 137—624.14; 251—47